United States Patent
Beller

(10) Patent No.: US 7,411,666 B2
(45) Date of Patent: Aug. 12, 2008

(54) OPTICAL TIME DOMAIN REFLECTOMETRY SYSTEM AT DIFFERENT WAVELENGTHS

(75) Inventor: Josef Beller, Tuebingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/639,458

(22) Filed: Dec. 15, 2006

(65) Prior Publication Data

US 2007/0091297 A1    Apr. 26, 2007

(30) Foreign Application Priority Data

Jul. 7, 2004    (WO) ................ PCT/EP2004/051380

(51) Int. Cl.
*G01N 21/00*    (2006.01)
(52) U.S. Cl. ..................................... 356/73.1
(58) Field of Classification Search ........................ None
See application file for complete search history.

(56) References Cited

U.S. PATENT DOCUMENTS

| | | | |
|---|---|---|---|
| 4,823,166 A | | 4/1989 | Hartog et al. |
| 5,708,500 A | * | 1/1998 | Anderson ................... 356/73.1 |
| 5,771,250 A | * | 6/1998 | Shigehara et al. ............... 372/6 |
| 6,700,655 B2 | | 3/2004 | Uchiyama et al. |
| 6,934,016 B2 | * | 8/2005 | Sobe et al. ................. 356/73.1 |

FOREIGN PATENT DOCUMENTS

GB    2 190 186    11/1987

OTHER PUBLICATIONS

International Search Report dated, Mar. 11, 2005.
Written Opinion dated Mar. 11, 2005.
Wait, P.C., et al : "Landau Placzek ratio applied to distributed fibre sensing" Optics Communications, North-Holland Publishing Co. Amsterdam, NL, vol. 22, No. 4, Jan. 1996, pp. 141-146, XP004000318, ISSN 0030-4018.
Glombitza U et al : "Sicherheit Durch Lwl in Engergieubertragungssystemen" Elektrotechnische Zeitschrift- Etz, Vde Verlag GMBH. Berlin, DE vol. 115, No. 21, Nov. 1, 1994, pp. 1256-1258, 1260, XP000477582 ISSN : 0948-7387.

* cited by examiner

*Primary Examiner*—Tu T Nguyen

(57) ABSTRACT

An optical time domain reflectometry system is used to determine a power response from a device under test -DUT-. For providing power information data, an optical transmitter launches a probe signal with a first wavelength into a DUT, an optical receiver determines optical power information of a first return signal returning from the DUT at a second wavelength, wherein the second wavelength is not equal to the first wavelength, and an analyzer analyzes the power information determined by the optical receiver, and generating data to be at least one of: visualized, stored, and further processed.

17 Claims, 2 Drawing Sheets

OPTICAL TIME DOMAIN REFLECTOMETRY SYSTEM AT DIFFERENT WAVELENGTHS

This application is the National Stage of International Application No. PCT/EP2004/051380, filed on 7 Jul. 2004, which designated the United States of America, and which international application was published as WO Publication No. WO 2006/002689, and which is incorporated by reference in its entirety.

BACKGROUND

The present invention relates to Optical Time Domain Reflectometry (OTDR).

The measurement principle of OTDR techniques applied in telecommunication today is based on the Rayleigh scatter mechanism. Rayleigh scatter occurs due to refractive index variations in an optical waveguide and forces a part of the optical wave to radiate in all directions. With refractive index changes at distinct locations, caused e.g. by air gaps in optical connectors, typically much higher power levels, compared to backscattered light, are reflected to an OTDR. The low scatter signal levels demand a very sensitive optical receiver, which in case of reflections, with power levels several orders of magnitude higher, is exposed to clipping and saturation. The recovery behavior of the receiver from such an overload is typically given by a delayed and falling decaying curve, which covers the tiny scatter signals for a time frame referred to as deadzone.

GB 2190186 discloses a method for an enhanced spatial detection of optical backscatter by modulating a pseudo random bit sequence onto a light source and transmitting this modulated beam into an optical device.

Rayleigh scattering is not the only mechanism that generates optical return signals. The two other well-known scatter signals are the Brillouin and the Raman scattering. Both occur at wavelengths different from the upstream traveling probe signal. The related technical background is e.g. described, in "Optical Fiber Communications" by J. Senior, Prentice Hall, 1992, pages 91-96.

SUMMARY

It is an object of the invention to provide an improved system for determining the optical power of backscattering light signals. The object is solved by the independent claims. Preferred embodiments are shown by the dependent claims.

According to embodiments of the invention, an optical time domain reflectometry system for determining a power response from a device under test -DUT -, comprises an optical transmitter for launching a probe signal with a first wavelength ($\lambda_0$) into a DUT, an optical receiver for determining optical power information of a first return signal returning from the DUT at a second different wavelength ($\lambda_1$), and a control unit or an analyzer for analyzing the power information determined by the optical receiver, and generating data to be visualized, stored, and/or further processed.

Scattering effects, e.g. Rayleigh scattering, Fresnel reflections, Raman scattering, cause a fraction of the forward traveling light to return from the DUT to the measurement system, where it is separated. Whereas the Rayleigh backscattering signals and the Fresnel reflection signals are returning at the same wavelength compared to the probe signal, other backscattered signals, e.g. the Raman Stokes signal are returning at different wavelengths. Thus the Rayleigh scattering cannot be separated from the Fresnel reflections. As the Fresnel reflections are typically of much higher power levels (several orders of magnitude) compared to backscattered Rayleigh light, traditional OTDR systems suffer from clipping and saturation effects just after such reflective events. The recovery behavior of the receiver from such an overload is typically given by a delayed and falling decaying curve, thus hiding potentially crucial information for a time frame referred to as deadzone.

The invention is based on the insight, that DUT loss information, e.g. fiber loss information, can also be derived from other backscattering signals, different from the Rayleigh backscattering effects; preferably from Raman (or Brillouin) scattering effects. As the Raman backscattering signals occur at different wavelengths compared to the Fresnel reflection signals, said Raman backscattering signals can be detected without running into any saturation effects. Thus it is e.g. possible to determine accurate insertion loss information even at locations of Fresnel reflections that are within the deadzone in OTDR systems according to the prior art.

In a further embodiment the optical receiver further detects an optical power of a second return signal returning from the DUT at a wavelength equal to the wavelength of the corresponding launched signal, i.e. the Rayleigh scatter signal. The power information of the first returning signal and the power information of the second returning signal is thereby preferably combined.

In a further embodiment, the location of a reflective event, the corresponding reflected power and the insertion loss associated with the reflective event can be determined.

In a further embodiment, the optical receiver detects the first return signal at the second wavelength ($\lambda_1$) with high sensitivity, and detects the second return signal at the first wavelength ($\lambda_0$) with high bandwidth.

In a further embodiment, the probe signal comprises a plurality of light pulses representing one or more digital sequences. The analyzer correlates the detected power information with the digital sequences, thereby determining a DUT response similar to a probe signal with one light pulse. The advantage is that the DUT response comprises significantly more energy (depending on the number of pulses of the pulse sequence) compared to a response of a single pulse. As examples for digital sequences, pseudo random codes or so-called Golay codes can be used.

In a further preferred embodiment, the measurement of the first return signal is performed on the base of a single pulse probe signal and the measurement of the second return signal is performed on the base of a multiple-pulse probe signal.

In another preferred embodiment the information about Fresnel reflections is derived by stimulating the DUT with a second light source. In this case another wavelength $\lambda_2$ is added which can be chosen independently from wavelengths $\lambda_0$ and $\lambda_1$.

The invention can be partly or entirely embodied or supported by one or more suitable software programs, which can be stored on or otherwise provided by any kind of data carrier, e.g. a data carrier being used by the analyzer, being part of the analyzer, or to be inserted to the analyzer.

BRIEF DESCRIPTION OF DRAWINGS

Other objects and many of the attendant advantages of embodiments of the present invention will be readily appreciated and become better understood by reference to the following more detailed description of preferred embodiments in connection with the accompanied drawing(s). Features that are substantially or functionally equal or similar will be referred to with the same reference sign(s).

DETAILED DESCRIPTION

Figure 1:
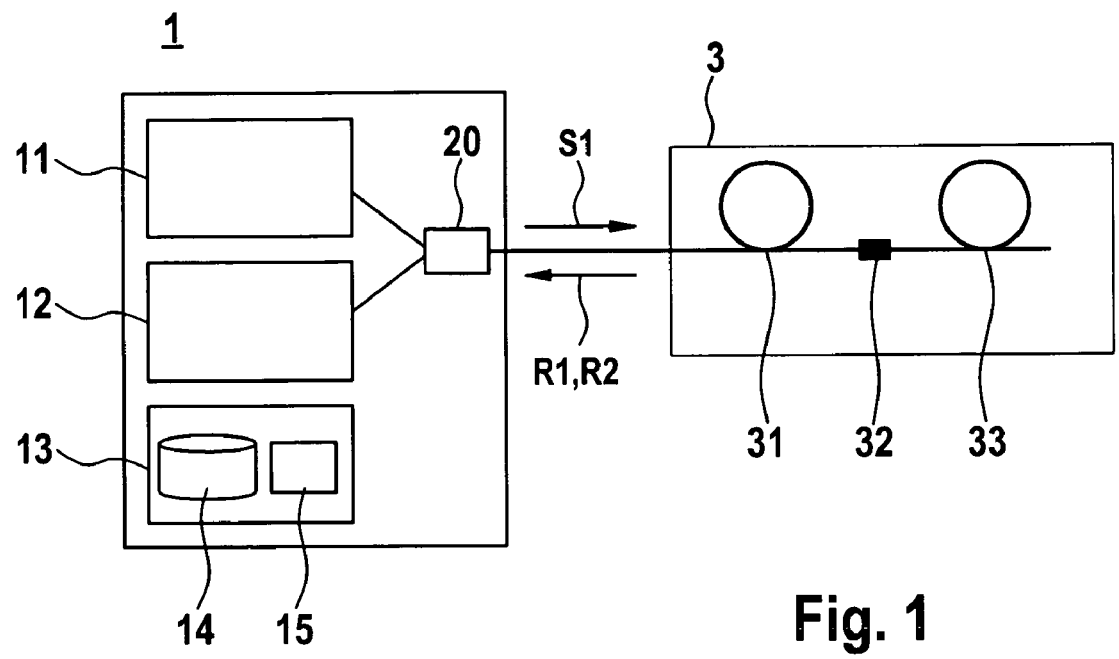
FIG. 1 shows a basic setup of an OTDR system according to the invention connected to an exemplary optical device under test.

FIG. 1 shows an OTDR system 1 connected to an optical device under test or DUT 3. OTDR system 1 comprises an optical transmitter 11, an optical receiver 12 and a control unit or an analyzer 13, wherein analyzer 13 comprises a storage device 14 and a processing unit 15. Further, OTDR system 1 comprises an optical coupler 20 connecting optical transmitter 11 and optical receiver 12 to DUT 3. By way of example, DUT 3 is an optical fiber composed of a first optical fiber piece 31 and a second optical fiber piece 33, said fiber pieces being connected by means of an optical connector 32.

Optical transmitter 11 emits a first optical probe signal S1, e.g. a continuous light signal, a pulse or a sequence of pulses, over coupler 20 into DUT 3. DUT 3 returns a first response signal R1 at a second wavelength $\lambda_1$ that is not equal to first wavelength $\lambda_0$ of the probe signal S1, and further returns a second response signal R2 at the probe wavelength. Optical receiver 12 receives both response signals R1 and R2, converts them into electrical signals that are proportional to each the optical power and transmits the electrical signals to analyzer 13. Analyzer 13 analyzes the power information and generates data that can used to be visualized on a display, or for any further processing, e.g. for supervision purposes.

Figure 2:
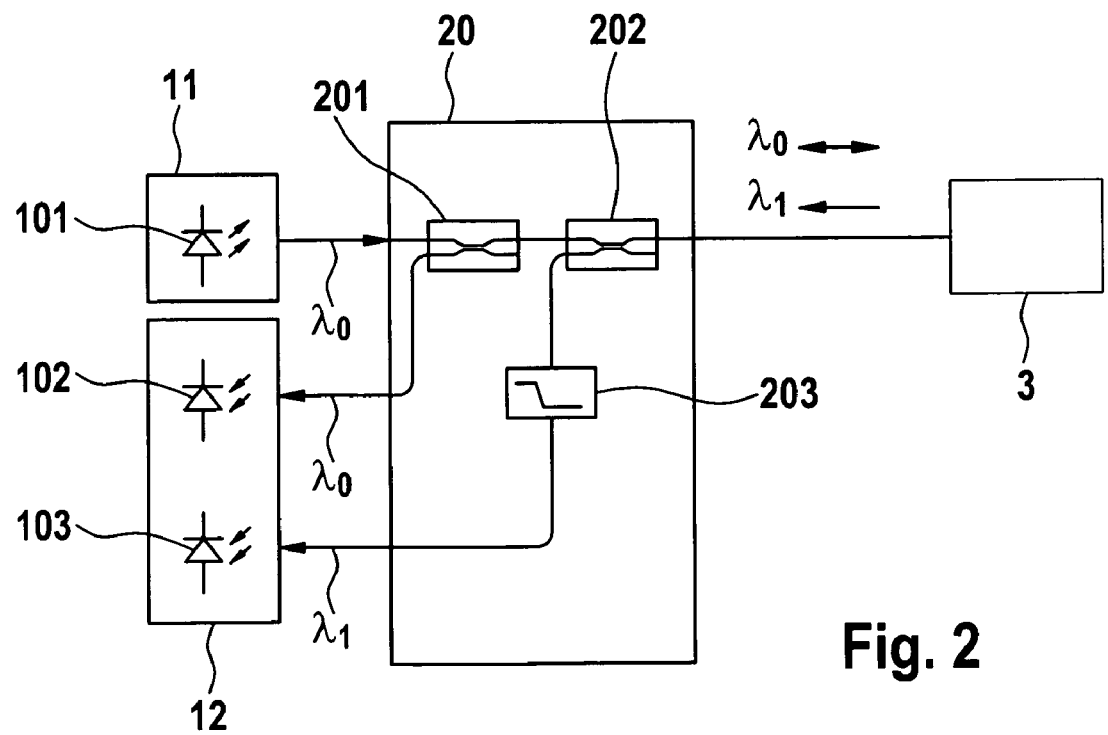
FIG. 2 shows a more detailed exemplary setup of the OTDR.

Referring now in greater detail to embodiments of the invention, FIG. 2 shows a preferred realization of an optical front end of a multiple-backscatter OTDR.

Optical transmitter 12 exemplary comprises a light source 101, preferably a laser diode with high output power. Light source 101 is coupled through a first coupler 201, and a second coupler 202, which is preferably a wavelength selective coupler, to the output port at which DUT 3 is connected. Optical receiver 12 exemplary comprises a first optical detector 102 and a second optical detector 103. The output of first coupler 201 is connected to first optical detector 102 and the output of second coupler 202 is connected via a selective filter 203 to second optical detector 103.

Light source 101 emits probe signal S1 consisting of short optical pulses or pulse sequences with wavelength $\lambda_0$. DUT 3, e.g. an optical fiber, responds to the upstream moving probe signal with various return signals, comprising inter alia Rayleigh scatter, light returning from fresnel reflections, both at first wavelength $\lambda_0$ (i.e. the wavelength of probe signal S1), and Raman scatter in the form of Stokes and anti-Stokes components, wherein the wavelength of these components are different to the wavelength of the probe signal S1.

First optical detector 102 measures backscattered and reflected light returning from DUT 3 at first wavelength $\lambda_0$ identical to the wavelength of probe signal S1, and second optical detector 103 measures signals at second wavelength $\lambda_1$. Preferably, second response signal S2 is the Stokes component of the Raman backscattered light with a wavelength (Raman stokes band) $\lambda_1 > \lambda_0$.

First coupler 201 preferably has a non-symmetrical split ratio, e.g. 95%-5% with the 5% tab connecting to first optical detector 102. Second coupler 202 is preferably a wavelength division multiplexer (WDM), connecting to second detector 103 ($\lambda_1$) via a filter 203 to suppress all signals except the returning Raman Stokes signal.

The returning light is separated into at least two different spectral portions. The Raman Stokes signal finds its way through second coupler 202 and optical selective filter 203 with a pass band around $\lambda_1$ to second detector 103 of optical receiver 12. The specifications for the Raman Stokes signal path require a low insertion loss at second wavelength $\lambda_1$, and attenuation as high as possible for first wavelength $\lambda_0$. Even the strongest signal at first wavelength $\lambda_0$ stemming from an optical reflection in DUT 3 should not exceed the filtered weak Raman signal. If this condition is met, the receiver measuring light at wavelength $\lambda_1$ does not see the strong reflections and can never be driven into overload. Therefore the receiver can be optimized for sensitivity, and overload recovery is of secondary importance. The reflectometric measurement of the Raman signal hence reveals accurately the course of the fiber loss, which is comparable to the Rayleigh scatter information without hiding crucial information shortly after a reflection, which normally is covered inside the deadzone region.

Alternatively to a realization as WDM, optical selective filter 203 can be realized as wavelength independent optical coupler. In this case the requirements for the filter 203 are more demanding and the overall round trip loss for any signal are significantly higher.

The measurement of the Raman Stokes signal does not give information about the strength of an optical reflection caused by refractive index changes at distinct locations of DUT 3, e.g. by air gaps in optical connector 32 of FIG. 1. Therefore, the acquisition of the returning signals at the first wavelength $\lambda_0$ is still desirable. Downstream light components at $\lambda_0$ travel with low loss through WDM 202 and with higher loss through first optical coupler 201 to first detector 102 of optical receiver 12. As the Rayleigh scatter is of much higher power level than the Raman signal, the optical front end is designed in a way to minimize the upstream losses at wavelength $\lambda_0$, plus the downstream losses at wavelength $\lambda_1$, and to compromise downstream losses at wavelength $\lambda_0$. Any spectral filtering here is not really required as the Rayleigh signal dominates over other portions by at least an order of magnitude. A coarse spectral filtering takes place in the WDM 202 anyway. With the loss information derived from the Raman scatter measurement, the strength of reflections, if any, is determined from the $\lambda_0$ signal. The corresponding receiver path preferably is designed for high bandwidth, high spatial resolution and fast overload recovery.

Further processing of the corresponding electrical Rayleigh and Raman signals at the receiver outputs can be performed like in state of the art OTDR. Especially noise reduction by signal averaging is a standard processing procedure.

Instead of coupler 20 being composed of fiber-based components 201, 202 and 203, other technologies, e.g. optical waveguides or bulk optics, which preferably combine several functions, can be applied.

In another preferred embodiment the two spectrally filtered downstream signals at wavelength $\lambda_0$, and wavelength $\lambda_1$ are alternately fed via an optical 1×2 switch to one receiver only.

In principle, Brillouin scattering can be acquired too, but this would mean more stringent restrictions for the light source and the optical filters.

Regarding the extremely low Raman signal level, a common averaging process might not deliver a sufficient signal-to-noise ratio (SNR) within an acceptable time frame. Therefore, instead of using single pulses, a code correlation technique is preferably used which vastly improves signal strength and thus SNR.

Whereas pseudo random codes as probing sequences are often suggested for correlation procedures, remaining side lobes in the autocorrelation result limit their usefulness in test instruments. On the contrary, complementary codes, in particular Golay codes, show at least under ideal conditions, no side lobes in the sum of their respective autocorrelation products. A Raman scatter signal taken by reflectometric measurements from an optical fiber is extremely well suited for such a correlation technique because of its rather homogeneous character. Further details of using code sequences for OTDR applications are e.g. described in U.S. Pat. No. 5,000,568 and U.S. Pat. No. 4,968,880.

In a further embodiment, an intermediate measurement result is derived from the returning Rayleigh signal, which contains information about strength and position of reflections. A second intermediate measurement result, derived from the correlated Raman scatter signal, comprises information about attenuation and loss versus distance of the tested fiber link.

Alternatively to the emission of pulses or pulse sequences, the OTDR system 1 emits a continuous wave signal, which is frequency or wavelength modulated.

Figure 3:
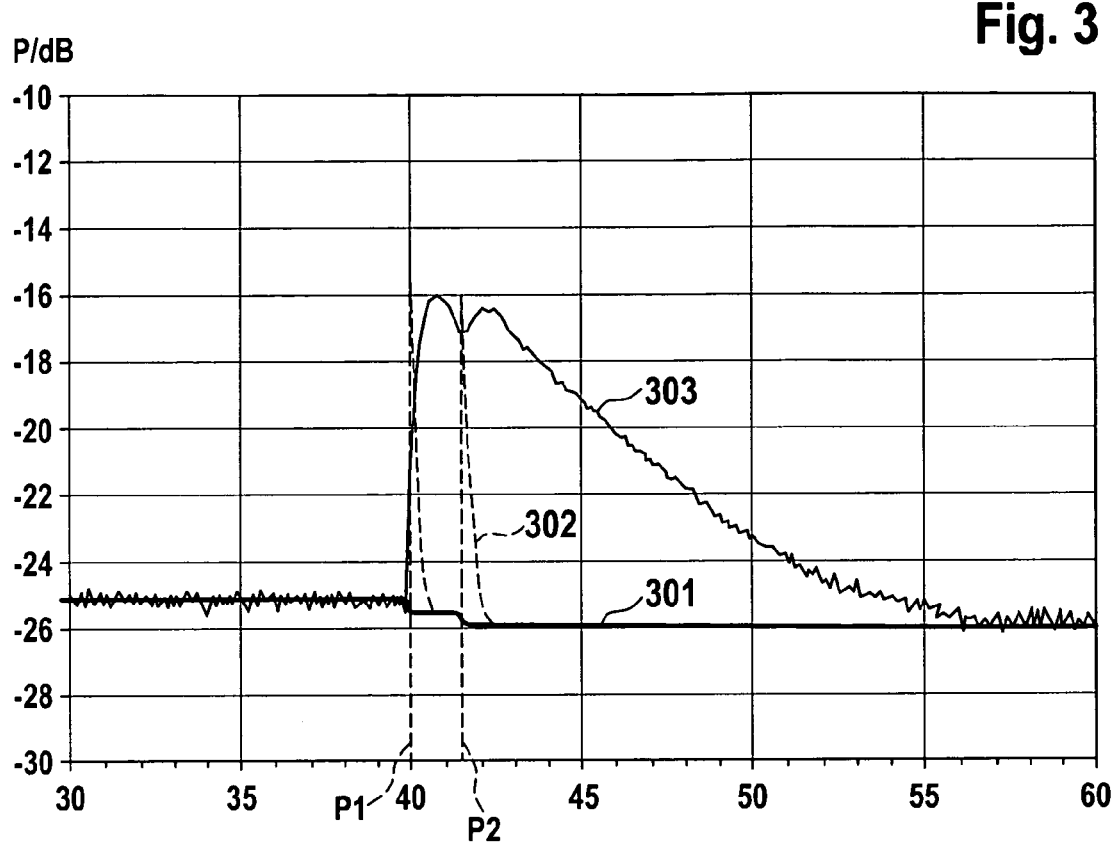
FIG. 3 shows a first exemplary visualization of returning power versus distance recorded by an OTDR system according to the invention.

FIG. 3 shows a graphical representation of an exemplary measurement of a 1.5-meter patch cord with two straight optical connectors taken with a standard OTDR at wavelength $\lambda_0$. A loss information curve (Raman backscatter signal) 301 at wavelength $\lambda_1$, in solid line, and reflection information curve 302, in dashed lines, are depicted as relative power over a section of the length I of the fiber. Further for comparison reasons, a measurement result curve 303 of an OTDR according to the prior art is depicted as dotted curve.

Differently to measurement result curve 303 of an OTDR according to the prior art, loss information curve 301 clearly shows the insertion losses of each of the connectors without any indication for reflections. The reflection information curve 302 is superimposed to loss information curve 301 to give an impression of connector positions P1 and P2 and corresponding reflection strengths.

Figure 4:
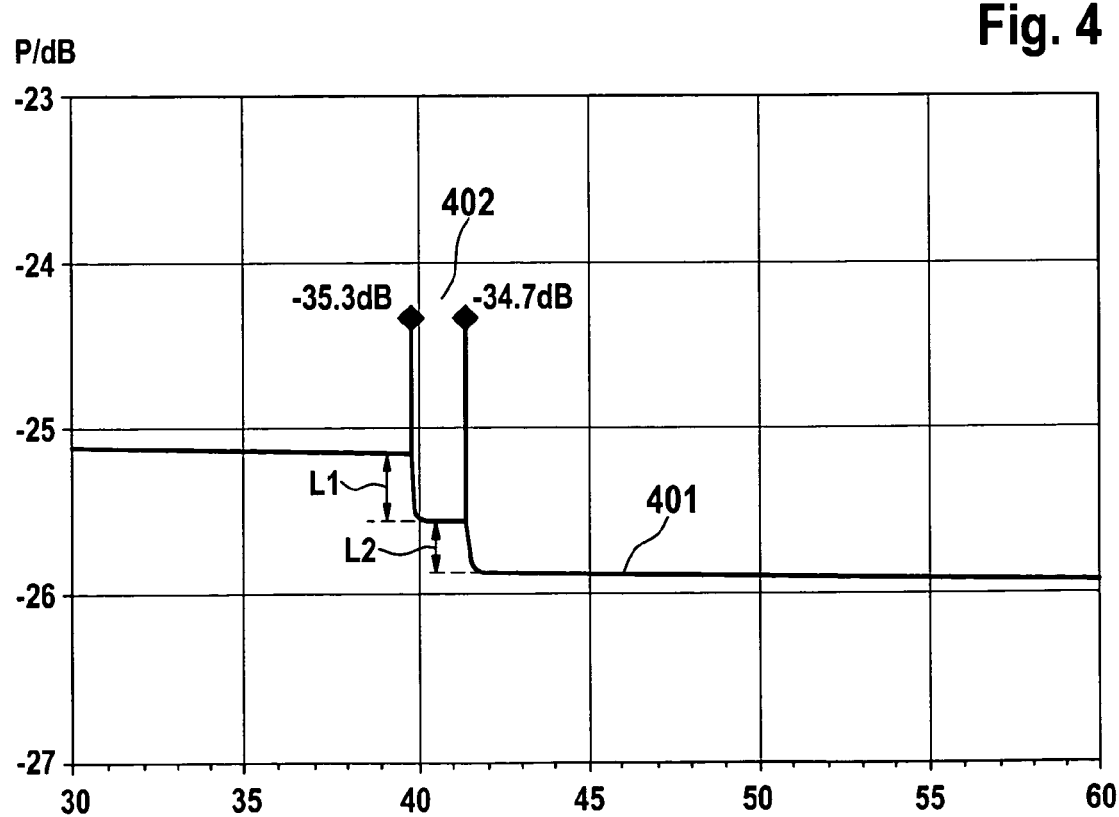
FIG. 4 shows an optimized second exemplary visualization of returning power versus distance recorded by an OTDR according to the invention.

FIG. 4 shows an optimized result, where the scale is expanded to allow for a closer view at the measurement results. FIG. 4 therefore shows an optimized loss information curve 401 and an optimized reflection information curve 402 depicted as symbols for reflections with explicit exemplary reflection power values. Indicating the position and strength of reflections, e.g. by symbolized bars, give comprehensive information about strength and position.

The two results, i.e. the loss information and the reflection information, can be displayed in various combinations, e.g. in different colors. Avoiding the reflections in the OTDR trace, i.e. symbolizing them by smaller bars or icons, has the advantage of being able to adapt the scale of the OTDR display to better fit the loss figures of the optical link.

As for the link loss measurement, the upstream wavelength differs from the downstream wavelength, i.e. the results for attenuation/loss are composite values. In order to come up with useful figures for the optical link attenuation the probing wavelength $\lambda_0$ and resulting Raman Stokes wavelength $\lambda_1$ must be selected deliberately. In a preferred embodiment upstream and downstream attenuation should be similar, a requirement which can be fulfilled for single-mode applications with $\lambda_0$ and $\lambda_1$ in a range around 1450 nm to 1650 nm.

In order to address the issue of accurate link loss measurements in a more elaborate way, transmitter 11 can accommodate a second light source with wavelength $\lambda_2$. Such a preferred embodiment can measure Raman or Brillouin scatter at wavelengths independent from the acquired Rayleigh signal. Transmit wavelengths $\lambda_0$ and $\lambda_2$ can be chosen in a way that wavelengths $\lambda_1$ and $\lambda_2$ are practically equal.

The invention claimed is:

1. An optical time domain reflectometry system for evaluating return signals in response to a probe signal with a first wavelength launched into a device under test - DUT -, comprising:
    an optical receiver for determining an optical power of a first return signal returning from the DUT at a second wavelength, wherein the second wavelength is different from the first wavelength and an optical power of a second return signal returning from the DUT at the first wavelength equal to the wavelength of the launched signal, and
    an analyzer adapted for analyzing the optical powers determined by the optical receiver, and generating data to be at least one of: visualized, stored, and further processed,
    wherein the analyzer is adapted for combining the determined optical power of the first returning signal and the optical power of the second returning signal for identifying a location of a reflective event and the corresponding reflected power.

2. The system of claim 1, wherein the analyzer is adapted for further identifying an insertion loss associated with the reflective event.

3. The system of claim 1, wherein the analyzer is adapted for generating visualization data with different colors or different styles being assigned to each of the different power information.

4. The system of claim 1, wherein the optical receiver is adapted for detecting the first return signal at the second wavelength with high sensitivity and detecting the second return signal at the first wavelength with high bandwidth.

5. The system of claim 1, further comprising a coupling device with a first coupler connectable to an optical transmitter and a second coupler connectable to the DUT, both couplers being connected in series thus providing a first optical path from the optical transmitter to the DUT, wherein the first optical coupler is adapted for coupling a portion of the returning light to a first detector of the optical receiver thus providing a second path from the DUT to the optical receiver for the first response signal, and wherein the second optical coupler is adapted for coupling out a further portion of the returning light to a second detector of the optical receiver thus providing a third path from the DUT to the optical receiver for the second response signal.

6. The system of claim 5, comprising an optical selective filter connected in between the second optical coupler and the second detector for selecting the first return signal from other returning signals coupled out by the second coupler.

7. The system of claim 6, wherein the second optical coupler is a wavelength selective coupler.

8. The system of claim 1, comprising an optical switch adapted for switching either the first return signal or the second return signal to one optical detector of an optical receiver.

9. The system of claim 1, further comprising an optical transmitter with one or more light sources.

10. The system of claim 9, wherein a first light source is adapted for generating the first probe signal that excites the first return signal and a second light source is adapted for generating a second probe signal that excites the second return signal.

11. The system of claim 1, wherein the first return signal basically comprises Rayleigh scatter signals and Fresnel reflection signals, and the second return signal basically comprises one of Raman scatter signals or Brillouin scatter signals.

12. The system of claim 1, wherein the probe signal is of a single light pulse.

13. The system of claim 1, wherein the probe signal comprises a plurality of light pulses representing one or more digital sequences and wherein the analyzer is adapted for correlating the detected power information with the digital sequences.

14. The system of claim 13, wherein the digital sequences are of one of: a pseudo random code type, a deterministic code type, and a complementary code type.

15. The system of claim 1, wherein the analyzer is adapted for performing the measurement of the first return signal on the base of a single pulse probe signal and performing the measurement of the second return signal on the base of a multiple-pulse probe signal.

16. The system of claim 1, wherein the first wavelength is selected such that the DUT attenuation for both the probe signal and the first return signal is substantially equal.

17. A method evaluating return signals in response to a probe signal with a first wavelength launched into an optical device under test - DUT -, comprising:

determining an optical power of a first return signal returning from the DUT at a second wavelength, wherein the second wavelength is different from the first wavelength, determining an optical power of a second return signal returning from the DUT at the first wavelength equal to the wavelength of the launched signal, and analyzing the optical powers determined by the optical receiver, and generating data to be at least one of: visualized, stored, and further processed, wherein the analyzing comprises combining the determined optical power of the first returning signal and the optical power of the second returning signal identifying a location of a reflective event and the corresponding reflected power.

* * * * *